(12) United States Patent
Brandt (10) Patent No.: US 7,690,048 B2
(45) Date of Patent: Apr. 6, 2010

(54) WARMING APPARATUS FOR MOTORCYCLIST

(76) Inventor: Jerry W. Brandt, P.O. Box 25695, Greenville, SC (US) 29616

( * ) Notice: Subject to any disclaimer, the term of this patent is extended or adjusted under 35 U.S.C. 154(b) by 280 days.

(21) Appl. No.: 11/717,872

(22) Filed: Mar. 14, 2007

(65) Prior Publication Data

US 2008/0222765 A1 Sep. 18, 2008

(51) Int. Cl.
*A41D 13/00* (2006.01)
(52) U.S. Cl. .......................................................... 2/22
(58) Field of Classification Search ................. 2/22, 2/24, 16, 455, 242, 908, 911; 128/878, 882
See application file for complete search history.

(56) References Cited

U.S. PATENT DOCUMENTS

| | | | |
|---|---|---|---|
| 3,783,534 A | 1/1974 | Phillips et al. | |
| 4,184,273 A | 1/1980 | Boyer et al. | |
| 4,457,552 A | 7/1984 | Katsuoka | |
| 5,469,637 A | 11/1995 | Adam | |
| 5,613,250 A | 3/1997 | Bell | |
| 6,964,062 B1 * | 11/2005 | Chen | 2/22 |

* cited by examiner

*Primary Examiner*—Tejash Patel
(74) *Attorney, Agent, or Firm*—J. Bennett Mullinax, LLC (57) ABSTRACT

An apparatus for warming a motorcyclist is provided. The apparatus includes a body that has an outer surface. The body has a shin portion and an adjacent lateral cnemis portion. The body has an end located at the lateral cnemis portion. The body has an upper edge and a lower edge that both terminate at the end. The end is in oblique orientation to both the upper edge and the lower edge. Additionally, a lip extends from the body.

9 Claims, 6 Drawing Sheets

WARMING APPARATUS FOR MOTORCYCLIST

FIELD OF THE INVENTION

The present invention relates generally to a warming device for a motorcyclist. More particularly, the present application involves a device for use in warming the legs and hands of a motorcyclist during operation of his or her motorcycle in cold weather conditions.

BACKGROUND

Motorcycles are commonly employed on our nation's highways for purposes of both transportation and recreation. Although providing a free driving experience, the open condition of a motorcycle subjects the operator to the elements which in some instances may be harsh. For example, rainy conditions can saturate the operator by way of either falling rain itself or through splashing from puddles or other vehicles on the roadway. Motorcyclists often wear rain gear in wet conditions for protection. Rain leggings are sometimes employed and extend from the feet of a motorcyclist to his or her knees. The rain leggings are made of a water resistant material and protect the shoes and legs of the operator when driving in wet conditions.

Although rain gear provides some level of protection to the motorcyclist in rainy conditions it does little to assist during operation of the motorcycle in cold conditions. Wind chill generated through the speed of the ride, in addition to the actual air temperature at the time, acts to draw heat from the operator. As such, the temperature of the air, the speed of the ride and the length of the ride all function to cool the motorcyclist. Motorcyclists are prone to becoming cold while operating a motorcycle because the motorcyclist typically remains seated and still during operation. As the motorcyclist does not move around during operation he or she generates very little heat through movement and consequently becomes progressively colder as the length of the ride increases. Apart from being uncomfortable, a cold motorcyclist may be more prone to make mistakes on the road due to tighter muscles, decreased reflexes and lack of focus.

In order to remain warm when riding in cold conditions a motorcyclist may employ layered or insulated clothing to reduce heat loss. Although warmer clothing may be effective for a period of time the rider will ultimately become colder as the length of the trip increases. Motorcyclists can also wear a wind barrier in order to minimize the effects of wind chill and can use hoods or scarves to prevent heat loss from exposed skin. Although such measures are effective at minimizing heat loss, the operator will still become cold given a ride of sufficient length. Another technique for reducing heat loss through use of a motorcycle in cold conditions involves the use of heated clothing. Heated clothing employs heat panels in the jacket, pants, gloves or socks that produce heat through electrical resistance. The heat panels can be plugged into an electrical outlet of the motorcycle or into an internal battery. Although capable of generating an amount of heat to keep the operator warm, heated clothing may be problematic in that the battery could die at an unexpected time. Additionally or alternatively, the electrical connections of the heated clothing may not be compatible with the electrical source of the motorcycle. As such, there remains room for variation and improvement within the art.

SUMMARY

Various features and advantages of the invention will be set forth in part in the following description, or may be obvious from the description, or may be learned from practice of the invention.

One aspect of one exemplary embodiment provides for an apparatus for warming a motorcyclist. The apparatus includes a body configured to be worn by a motorcyclist so as to cover at least a portion of the cnemis of the leg of the motorcyclist. The body has an outer surface that is configured to at least partially cover, and extend generally from, the shin of the motorcyclist across the lateral side of the cnemis of the motorcyclist and terminate at an end that does not extend across the calf to the medial side of the cnemis of the motorcyclist when the body is worn by the motorcyclist. A lip extends from the end of the body in a direction generally towards the medial side of the cnemis of the motorcyclist when the body is worn by the motorcyclist.

Another aspect is found in an exemplary embodiment as immediately discussed in which the body has an inner surface and in which the lip has an inner surface. At least a portion of the inner surface of the body and the inner surface of the lip define a space into which heated air is present during operation of the motorcycle when the body is worn by the motorcyclist.

A further aspect of another exemplary embodiment is found in an apparatus as previously discussed in which the body has an upper edge that terminates at the end of the body. The body has a lower edge that terminates at the end of the body. The end is oriented with respect to the upper edge and lower edge so that the end extends between the upper edge and the lower edge at an angle that is not perpendicular to the upper edge and the lower edge.

Another aspect of an additional exemplary embodiment resides in an apparatus as mentioned above that further includes a blocking member located at a second end of the body. The blocking member is at least partially made of a resilient material. The blocking member is configured to be disposed against the motorcycle during operation of the motorcycle when the body is worn by the motorcyclist.

Another aspect of a further exemplary embodiment is found in an apparatus for warming a motorcyclist. The apparatus includes a body that has an outer surface. The body has a shin portion and an adjacent lateral cnemis portion. The body has an end located at the lateral cnemis portion. The body has an upper edge and a lower edge that both terminate at the end. The end is in oblique orientation to both the upper edge and the lower edge. A lip extends from the body.

Yet another aspect exists in an apparatus as immediately discussed in which the lip is located at the end. The lip has an outer surface that is oriented generally perpendicular to the outer surface of the lateral cnemis portion.

A further aspect resides in an exemplary embodiment as all ready mentioned that additionally includes a second lip that extends from the body. The first lip and the second lip extend in opposite directions from one another from the body.

Another aspect of an additional exemplary embodiment is found in an apparatus as mentioned prior in which the body has a medial cnemis portion adjacent the shin portion. The body has a second end located at the medial cnemis portion. The upper edge and the lower edge of the body both terminate at the second end. The second end is in oblique orientation to both the upper edge and the lower edge.

Another aspect of a further exemplary embodiment resides in an apparatus as immediately mentioned in which the end is oriented at an angle from 92° to 98° to the lower edge as the end extends from the lower edge to the upper edge. The second end is oriented at an angle from 86° to 89° to the lower edge as the second end extends from the lower edge to the upper edge.

A further aspect of another exemplary embodiment is found in an apparatus for warming a motorcyclist. The apparatus includes a body that has an outer surface and an inner surface. The body has a shin portion and an adjacent lateral cnemis portion. The body has a medial cnemis portion adjacent the shin portion. The body has an end located at the lateral cnemis portion. The body has an upper edge and a lower edge that both terminate at the end. The end is in oblique orientation to both the upper edge and the lower edge. A lip extends from the lateral cnemis portion in a direction generally towards the medial side of the cnemis of the motorcyclist when the body is worn by the motorcyclist. The lip has an inner surface. At least a portion of the inner surface of the body and the inner surface of the lip define a space into which heated air is present during operation of the motorcycle when the body is worn by the motorcyclist. A second lip extends from the lateral cnemis portion in a direction generally away from the medial side of the cnemis of the motorcyclist when the body is worn by the motorcyclist.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for an apparatus 10 that can be used by a motorcyclist 12 in order to provide heat to the motorcyclist 12 during operation of a motorcycle 14. An apparatus 10 can be placed on the leg 16 of the motorcyclist 12. As the motorcycle 14 is driven, air flows around a body 28 of the apparatus 10 and encounters a lip 38 which functions to draw air across a space 46 that is proximate to the leg 16 of the motorcyclist 12. Heat given off by components of the motorcycle 14 such as the engine and exhaust is transferred through this space 46 or otherwise captured by the apparatus 10. The generated heat thus warms the leg 16 of the motorcyclist 12 and provides a space 46 into which the motorcyclist 12 may temporarily place his or her hand throughout the ride for heat. The apparatus 10 thus captures heat which otherwise would have been wasted by the motorcycle 14 and distributes this heat to the motorcyclist 12 in a manner that reduces or alleviates the effects suffered by the motorcyclist 12 during cold weather riding. Apparatuses 10 can be placed on both the right and left legs 16 of the motorcyclist 12 to achieve a greater heating effect than that in which only a single apparatus 10 is employed.

Figure 1:
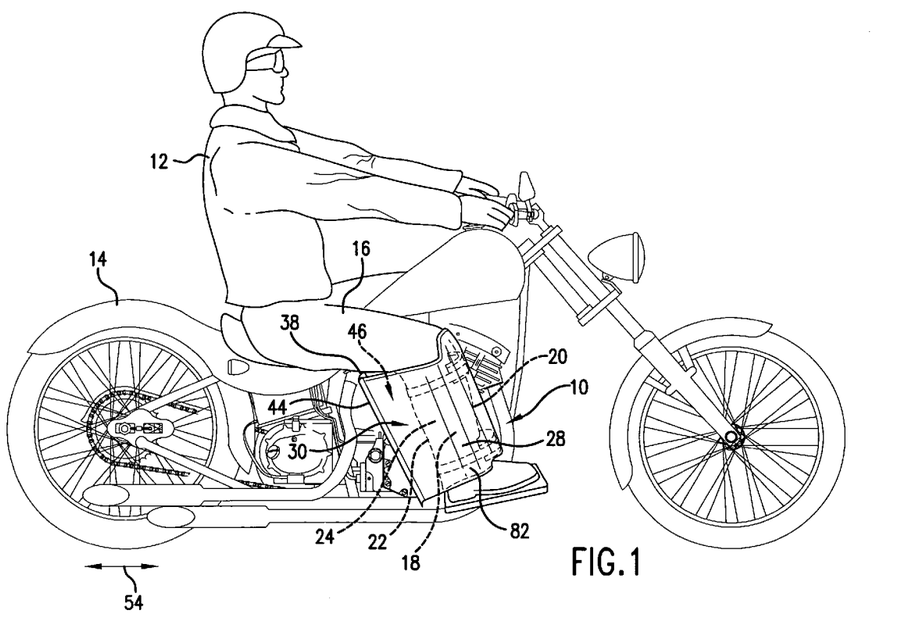
FIG. 1 is a perspective view of a motorcyclist on a motorcycle wearing a warming apparatus in accordance with one exemplary embodiment.

A motorcyclist 12 donning one exemplary embodiment of the apparatus 10 is shown in FIG. 1. As shown, the apparatus 10 is located proximate to heat generating components of the motorcycle 14 when the motorcyclist 12 places his foot in the normal riding position. A body 28 of the apparatus 10 circles a portion of the leg 16 of the motorcyclist 12. The body 28 covers a portion or all of the shin 20 and the lateral side 24 of the cnemis 18 of the leg 16 of motorcyclist 12. The calf 22 is generally not covered by the body 28. Although FIG. 1 shows only the right leg 16 of the user 12 with apparatus 10, it is to be understood that the left leg (not shown) may also be fitted with an apparatus 10 for similarly capturing heat generated by the motorcycle 14 in order to heat the motorcyclist 12 during the ride.

Figure 2:
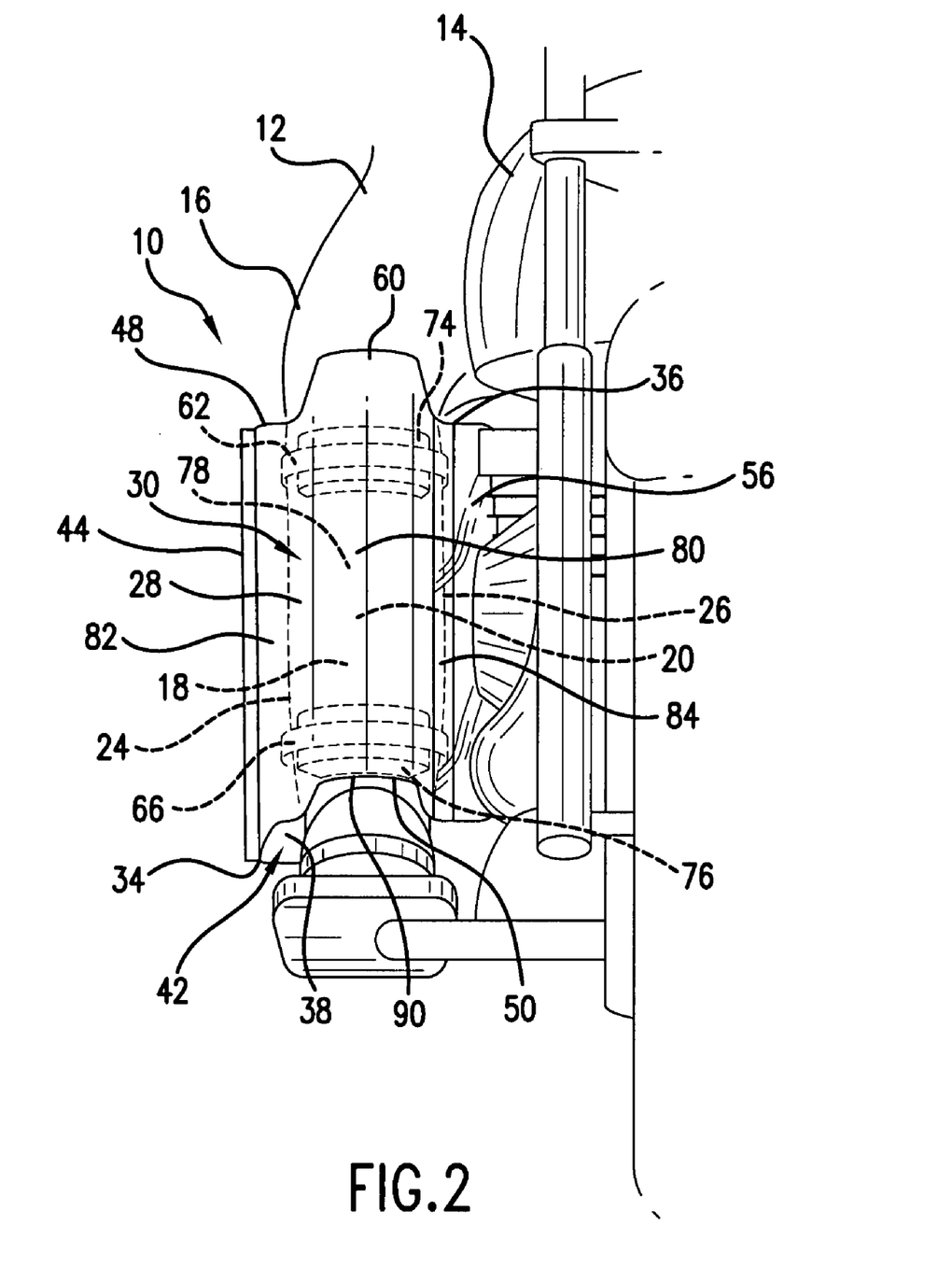
FIG. 2 is a front view of the apparatus of FIG. 1 when worn by a motorcyclist.

FIG. 2 shows a front view of the apparatus 10 when worn by a motorcyclist 12 while riding motorcycle 14. As shown, the apparatus 10 is attached so as to be located on the cnemis 18 of the leg 16 of user 12. The body 28 of apparatus 10 covers essentially all of the shin 20 of user 12 and extends across at least a portion of both the lateral side 24 and medial side 26 of the cnemis 18. The body 28 is flexible to a degree so that an outer surface 30 of body 28 has both planar portions and curved portions. However, it is to be understood that in accordance with other exemplary embodiments that the body 28 may be a rigid component or include rigid components. The body 28 can be made of any suitable material. For example, leather may be used to construct body 28 in one embodiment. Body 28 can be single layered or multi-layered in various embodiments. In one such embodiment, body 28 includes an inner layer made of a leather or leather-like material adjacent a one-half inch foam layer. A one-sixteenth inch layer of plastic is adjacent the foam layer and an outer layer of leather or leather-like material is included. The plastic layer functions to provide shaping to the body 28 while the foam layer provides a cushioning effect.

As an initial matter, body 28 functions as a wind barrier to reduce the effects of wind chill on the cnemis 18 of the user 12. As shown, a shin portion 80 of body 28 completely covers the shin 20 of the user 12. The shin portion 80 thus extends from the foot or ankle of the motorcyclist 12 to his or her knee. The body 28 may also include a knee guard portion 60 that extends from the shin portion 80 and covers the knee of the user 12. Body 28 can be non-porous so that wind generated through riding the motorcycle 14 does not penetrate the skin of the user's 12 knee or shin 20 to draw heat therefrom. A foot cut out 90 is defined by the body 28 in order to accommodate the position of and movement of the foot of the user 12.

A medial cnemis portion 84 of the body 28 extends from the shin portion 80 and covers at least a part of the medial side 26 of the cnemis 18 of the user 12. The medial cnemis portion 84 can likewise act to reduce wind chill on the medial side 26 of the cnemis 18 of the user 12. A blocking member 56 may extend from the medial cnemis portion 84 in the direction towards the motorcycle 14 when the user 12 rides motorcycle 14. The blocking member 56 can be integrally formed with body 28 or may be a separate component that is attached thereto. The blocking member 56 can include a resilient material such as a foam or rubber. During operation of motorcycle 14, the blocking member 56 is positioned against a side of the motorcycle 14 as shown in FIG. 2. The resiliency of blocking member 56 provides room for variation between different motorcycles 14 and foot placements of the user 12 while driving. The blocking member 56 functions to prevent or minimize wind flow between the medial cnemis portion 84 of body 28 and the side of motorcycle 14. Elimination or reduction of wind flow between these two components allows a greater amount of heat to be trapped and eventually employed by the apparatus 10 to heat the motorcyclist 12. Although shown as extending completely from the medial cnemis portion 84 to the side of the motorcycle 14 in FIG. 2, it is to be understood that in other embodiments the blocking member 56 need not completely fill the gap between the body 28 and the side of motorcycle 14. In these instances, a space will exist through which wind may flow between the apparatus 10 and the side of motorcycle 14. However, even in these instances the blocking member 56 will function to provide a greater amount of wind reduction. Although shown as including a blocking member 56, it is to be understood that this component need not be included in accordance with other exemplary embodiments of the present invention.

A scratch guard 58 can also be included on the outer surface 30 of the medial cnemis portion 84. Scratch guard 58 can be made of a relatively soft material in order to prevent the apparatus 10 from damaging components of the motorcycle 14 through contact therewith. In accordance with other embodiments, a scratch guard 58 may extend across portions of the outer surface 30 of body 28 at areas other than or in addition to the medial cnemis portion 84. Likewise, the scratch guard 58 need not be present in other exemplary embodiments. As an alternative to or in addition to the scratch guard 58, the outer surface 30 of body 28 may be made of a material that will not scratch components of the motorcycle 14.

Figure 3:
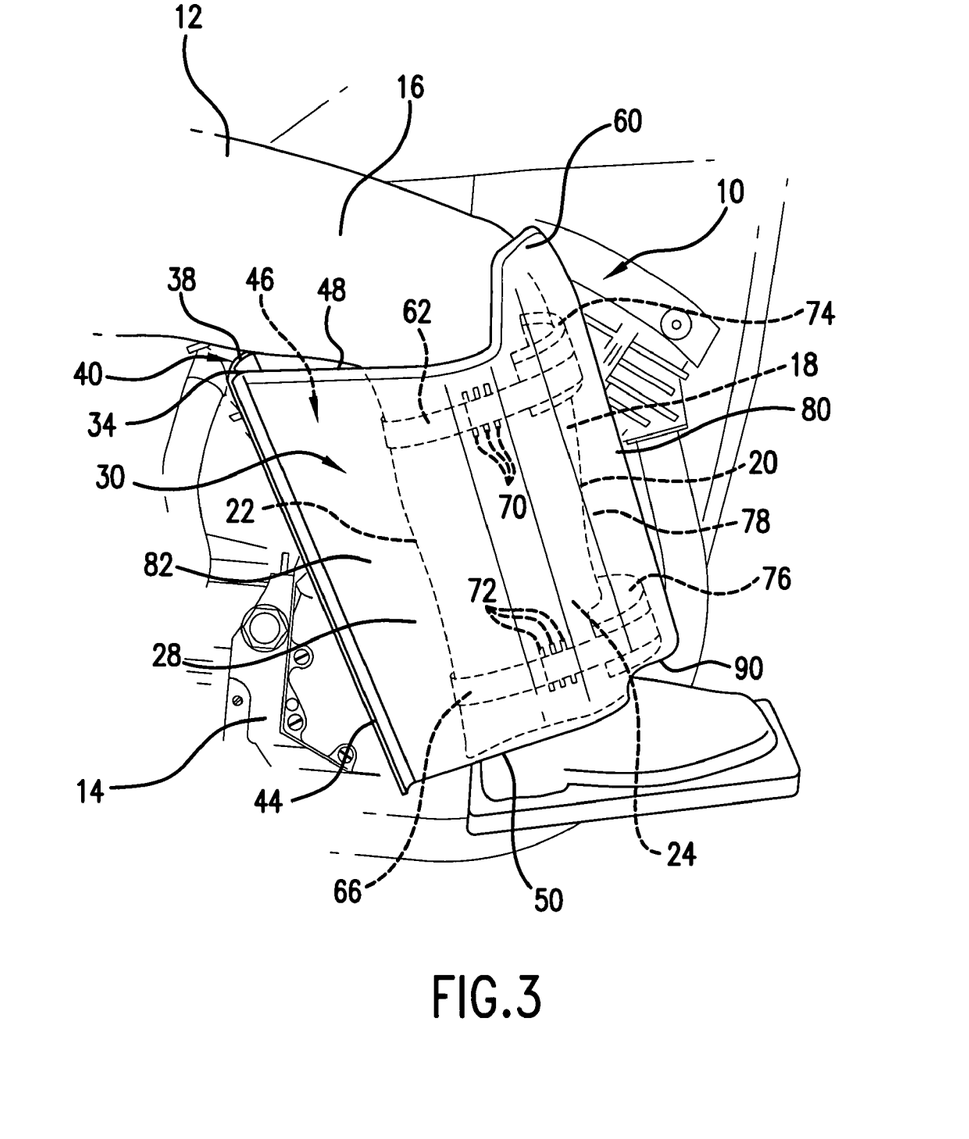
FIG. 3 is a side view of the apparatus of FIG. 1 when worn by a motorcyclist.

A side view of the apparatus 10 attached to the cnemis 18 of the user 12 is shown in FIG. 3. A lateral cnemis portion 82 of the body 28 extends from the shin portion 80. The lateral cnemis portion 82 covers the lateral side 24 of the cnemis 18 of the user 12 when the apparatus 10 is worn. The lateral cnemis portion 82 may extend from the foot to the knee of the motorcyclist 12. The lateral cnemis portion 82 can be arranged so that a part of its outer surface 30 extends in a generally planar configuration off of the lateral side 24 of the cnemis 18 when the apparatus 10 is attached. Other configurations are also possible in which the outer surface 30 of the lateral cnemis portion 82 has a curved shape across both the lateral side 24 of cnemis 18 and also at the point in which the lateral cnemis portion 82 extends beyond the lateral side 24. The lateral cnemis portion 82 includes an end 34 of body 28.

A lip 38 extends from the end 34 in a direction generally towards the motorcycle 14. As such, lip 38 extends generally in the medial direction from the end 34. A second lip 44 is also present and extends from the lateral cnemis portion 82 in an opposite direction to that of lip 38. As such, the second lip 44 extends in a lateral direction from the cnemis 18 from the body 28. Second lip 44 extends between an upper edge 48 and a lower edge 50 of the body 28. Operation of motorcycle 14 causes wind to contact the apparatus 10 and flow across its outer surface 30. Wind will thus flow across the outer surface 30 of the lateral cnemis portion 82 and off of end 34 of the body 28. The generated wind flow across and around apparatus 10 may have a tendency to pull the apparatus 10 in the lateral direction such that the apparatus 10 is pulled away from the motorcycle 14. As such, the apparatus 10 may act to pull the legs 16 of the user 12 outward when driving the motorcycle 14. The second lip 44 is included in order to modify the air flow across and around apparatus 10 so that the tendency of the apparatus 10 to be pulled outwards in the lateral direction is reduced or eliminated. In other embodiments the second lip 44 may be constructed so that it does not extend essentially all of the way between the upper edge 48 and the lower edge 50 of the body 28. Further, the second lip 44 need not be present in accordance with other exemplary embodiments of the apparatus 10. In these embodiments, the pull of the apparatus 10 on the legs 16 of the user 12 is minimal and does not pose a problem. Alternatively, the position or shape of the apparatus 10 can be changed or additional features may be included or removed so that the tendency of the apparatus 10 to want to pull the legs 16 outward in the lateral direction is reduced or eliminated.

Figure 4:
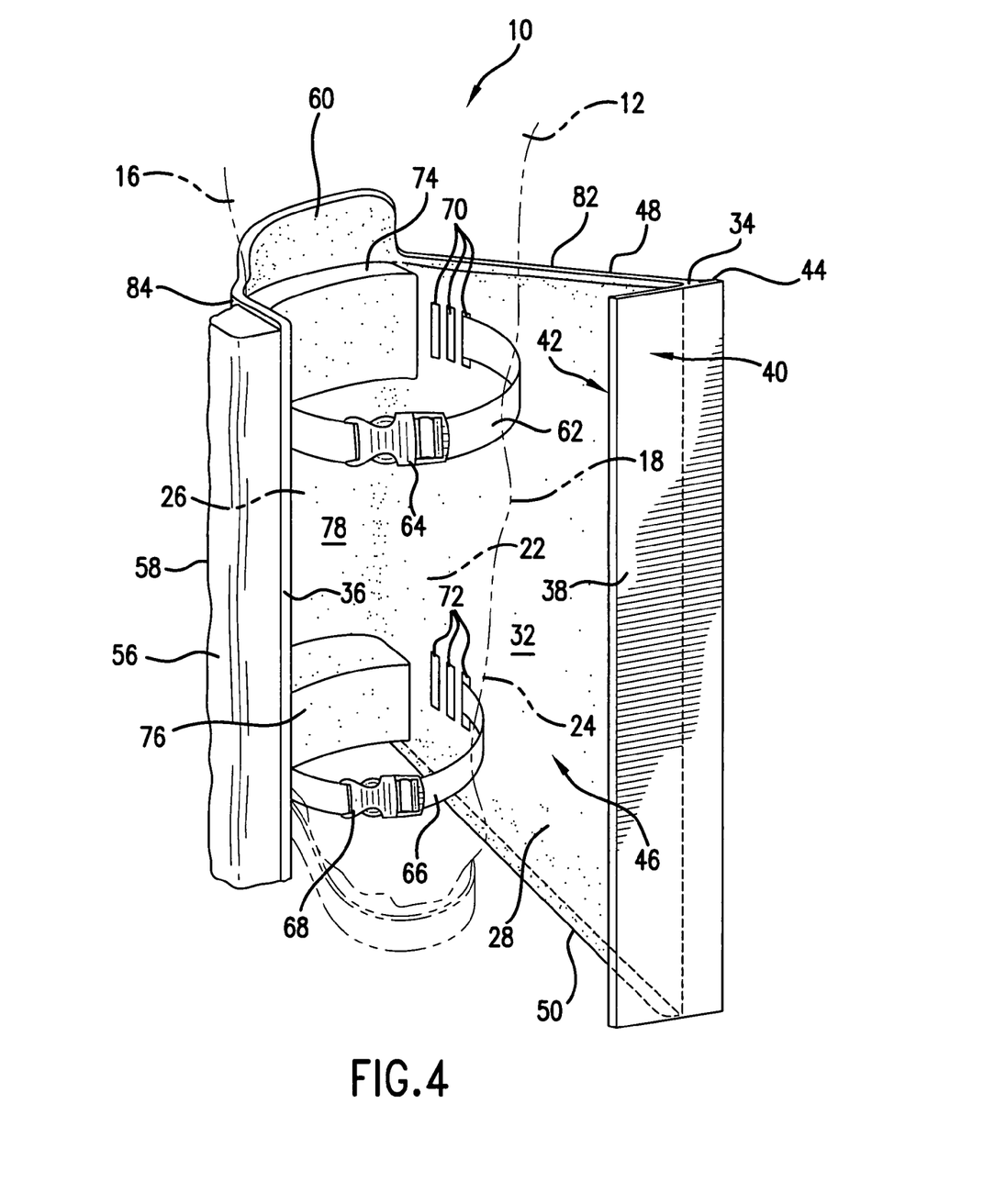
FIG. 4 is a perspective view from a back angle of the apparatus of FIG. 1 when worn by a motorcyclist.

A perspective view of the back of the apparatus 10 and leg 16 of the user 12 is shown in FIG. 4. As shown, the body 28 of apparatus 10 extends around the lateral side 24 and medial side 26 of the cnemis 18 of the user 12 but does not extend around the calf 22 of the user 12. As such, various exemplary embodiments are provided in which the calf 22 of the user 12 is not covered by the apparatus 12. Further embodiments exist in which a portion of the calf 22 of user 12 is covered by the body 28. The lip 38 is shown as extending from the end 34 of body 28 in a direction generally towards the motorcycle 14. The outer surface 40 of the lip 38 is generally planar, although other shapes are possible in accordance with other exemplary embodiments. In addition, the lip 38 can define apertures therethough or as shown in FIG. 4 may be a solid piece that lacks apertures. The lip 38 is shown as extending from the lower edge 50 to upper edge 48 of the body 28. In accordance with other embodiments the lip 38 does not extend all the way completely between edges 48 and 50. Lip 38, in addition to or alternatively to second lip 44, may be integrally formed with body 28 or can be a separate component that is attached thereon. Lip 38 and/or second lip 44 can be single or multi-layered. As shown, the lateral cnemis portion 82 extends a greater distance in the forward/rearward direction 54 of the motorcycle 14 than the medial cnemis portion 84. The outer surface 30 of the lateral cnemis portion 82 may have a greater surface area than the outer surface 30 of the medial cnemis portion 84. However, it is to be understood that the lateral cnemis portion 82 and the medial cnemis portion 84 may have the same size in accordance with other exemplary embodiments.

The lip 38 can be made of a relatively rigid material so that its shape does not change upon exposure to wind forces during a ride. The inner surface 42 of the lip 38 and a portion of the inner surface 32 of body 28 define a space 46. Although not wishing to be bound by any one theory of operation, Applicant theorizes that during operation of motorcycle 14, wind flows across the outer surface 30 of the lateral cnemis portion 82 and lip 38 functions to create an area of lower pressure within space 46. The space 46 may be thus thought of as a vacuum or vacuum-like. As such, wind forces are not as great behind apparatus 10 as they are in front of apparatus 10. Heat from components of the motorcycle 14 can be transferred through convection to the space 46. The arrangement of apparatus 10 causes air flow within space 46 to be vertical in nature so that heat therein is blown upwards along the leg 16 of the user 12. The cnemis 18 and subsequently the thigh of the motorcyclist 12 are heated by the warmed air flow. The motorcyclist 12 may also, temporarily, warm his or her hand by placing it into heated space 46 while riding the motorcycle 14.

The shin 20 of the motorcyclist 12 contacts a pair of pads 74 and 76 that extend from the inner surface 32 of the body 28. In order to position the apparatus 10 at a desired location on the cnemis 18, the first pad 74 has a smaller height than the second pad 76. In other embodiments, the thicknesses of the pads 74 and 76 may be different from one another. Still further embodiments are possible in which the pads 74 and 76 have the same height and thickness. The pads 74 and 76 can be made of a resilient material such as foam or rubber. The pads 74 and 76 are positioned from one another in order to define a space 78 therebetween. Heated air can flow through space 78 in order to heat the shin 20 of the user 12. Additionally, the presence of space 78 may act to help derive an advantageous flow of heated air across the inner surface 32 of the body 28 so that air flow and hence heat is better transferred from the space 46 along the leg 16 of the user 12. Although shown as defining a space 78, it is to be understood that other embodiments are possible in which the space 78 is not present. Further, a pair of pads 74 and 76 need not be employed in other embodiments. In these arrangements, only a single pad 74 or 76 can be used, or the pads 74 and 76 may be absent all together.

A pair of straps 62 and 66 are used to attach the apparatus 10 to the cnemis 18. Strap 62 acts to hold the first pad 74 to the calf 22 of the user 12, and strap 66 holds the second pad 76 to calf 22 in a similar manner. Straps 62 and 66 can be variously arranged on the apparatus 10. In a multi-layered configuration of the body 28 as described above the straps 62 and 66 can be at least partially located in the body 28 and positioned between the one-sixteenth inch plastic layer and the outer leather or leather-like material layer. In alternative arrangements the straps 62 and 66 can be disposed through the body 28 and lie against its outer surface 30. A snap-fit releasable engagement 64 can be used in order to attach and detach strap 62 to the cnemis 18 of the user 12. In alternative arrangements, the strap 62 need not have a releasable engagement but can be flexible so that the apparatus 10 can be slid onto and off of the cnemis 18. As shown, a snap-fit releasable engagement 68 is used in order to allow the strap 66 to be attached and detached from the cnemis 18.

Variable attachment points 70 are present in order to allow the position of strap 62 to be varied with respect to the first pad 74. In this manner, the lateral/medial position of strap 62 can be varied with respect to body 28 so that the strap 62 can be adjusted to accommodate variously sized and shaped legs 16 of the user 12. This type of adjustment can also be made in order to modify the shape and/or orientation of the body 28 and lip 38 so that a more effective heat transfer is realized. Additional attachment points 72 are included in order to afford a similar adjustment to strap 66. It is to be understood that the disclosed method of attachment of the apparatus 10 to the leg 16 of the user 12 is but one example and that other arrangements can be used in other embodiments.

Figure 5:
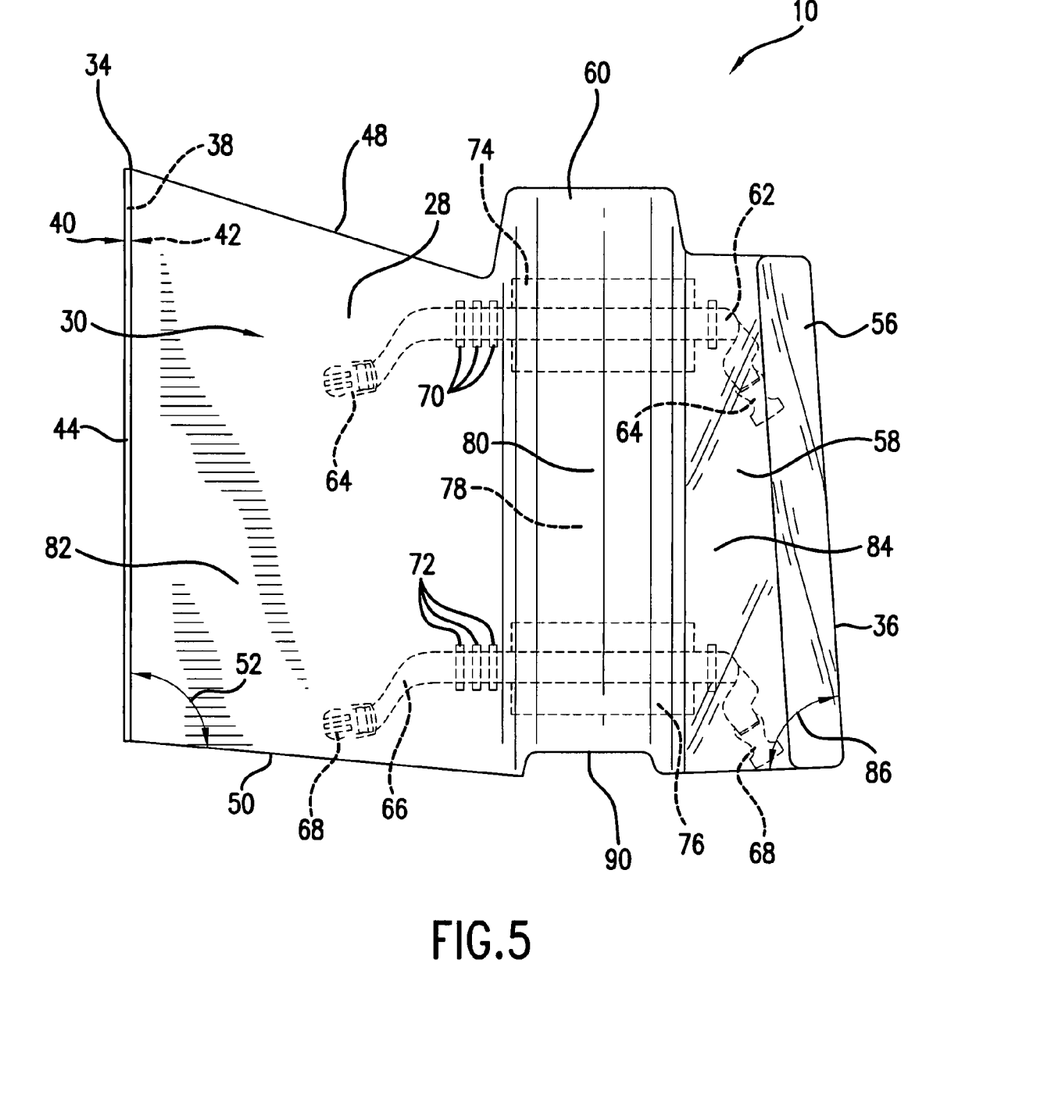
FIG. 5 is a front, flatted plan view of an apparatus to be worn on the right leg of a motorcyclist for warming purposes in accordance with one exemplary embodiment.

A flat plan view of the apparatus 10 is shown in FIG. 5. The apparatus 10 is shown detached from the motorcyclist 12 and flatted out with the outer surface 30 of body 28 shown. The particular apparatus 10 shown in FIG. 5 is to be worn on the right leg 16 of the user 12. As shown, the end 34 of the body 28 is in an oblique orientation to both the upper edge 48 and lower edge 50 of the body 28. The end 34 thus extends at an angle 52 from the lower edge 50 to the upper edge 48 of the body 28. The angle 52 may be from 92° to 98° in accordance with certain exemplary embodiments. In accordance with other exemplary embodiments, the angle 52 may be up to 110°. In accordance with still further exemplary embodiments the angle 52 can be from 75° to 120°. Other embodiments are possible in which angle 52 is 90°. The angle 52 can be varied in different embodiments in order to account for different foot rest positions of both different motorcycles 14 and different users 12. The lip 38 extends from and is generally perpendicular to the end 34. As such, the lip 38 will also be oriented at an angle 52 so that the outer and inner surfaces 40 and 42 of the lip 38 are oriented at angle 52. Applicant theorizes that the angular orientation of the lip 38 functions to achieve the desired air flow along inner surface 32 of body 28 so that heat is effectively transferred along the leg 16 of the user 12. Referring momentarily back to FIG. 1, it may be seen that the orientation of the lip 38 can be varied depending upon the particular orientation of the leg 16 of the motorcyclist 12 when riding. However, Applicant has found that an angled lip 38 helps achieve a desired heat transfer from apparatus 10 even in situations in which the motorcyclist 12 varies the orientation of his or her leg 16. The lip 38 and end 34 generally extend rearward in the forward/rearward direction 54 of the motorcycle 14 from the lower edge 50 to the upper edge 48. Although described as being in oblique orientation, it is to be understood that other arrangements of the apparatus 10 are possible in which the end 34 and/or lip 38 is perpendicular to the upper and lower edges 48 and 50.

Referring back to FIG. 5, the body 28 has a second end 36 that is located in the medial cnemis portion 84. The second end 36 is disposed in an oblique orientation to both the upper edge 48 and the lower edge 50 of the body 28. The second end 36 is oriented at an angle 86 extending from the lower edge 50 to the upper edge 48. In accordance with one exemplary embodiment angle 86 is from 86° to 89°. Other exemplary embodiments exist in which the angle 86 is up to 110°. In accordance with other exemplary embodiments angle 86 may be from 75° to 110°. In accordance with a further exemplary embodiment angle 86 is 90°. Angle 86 may be the same as or different from the angle 52. The second end 36 and the blocking member 56 may be oriented at such an angle in order to help the apparatus 10 achieve a desired heat/air flow during operation of the motorcycle 14.

Figure 6:
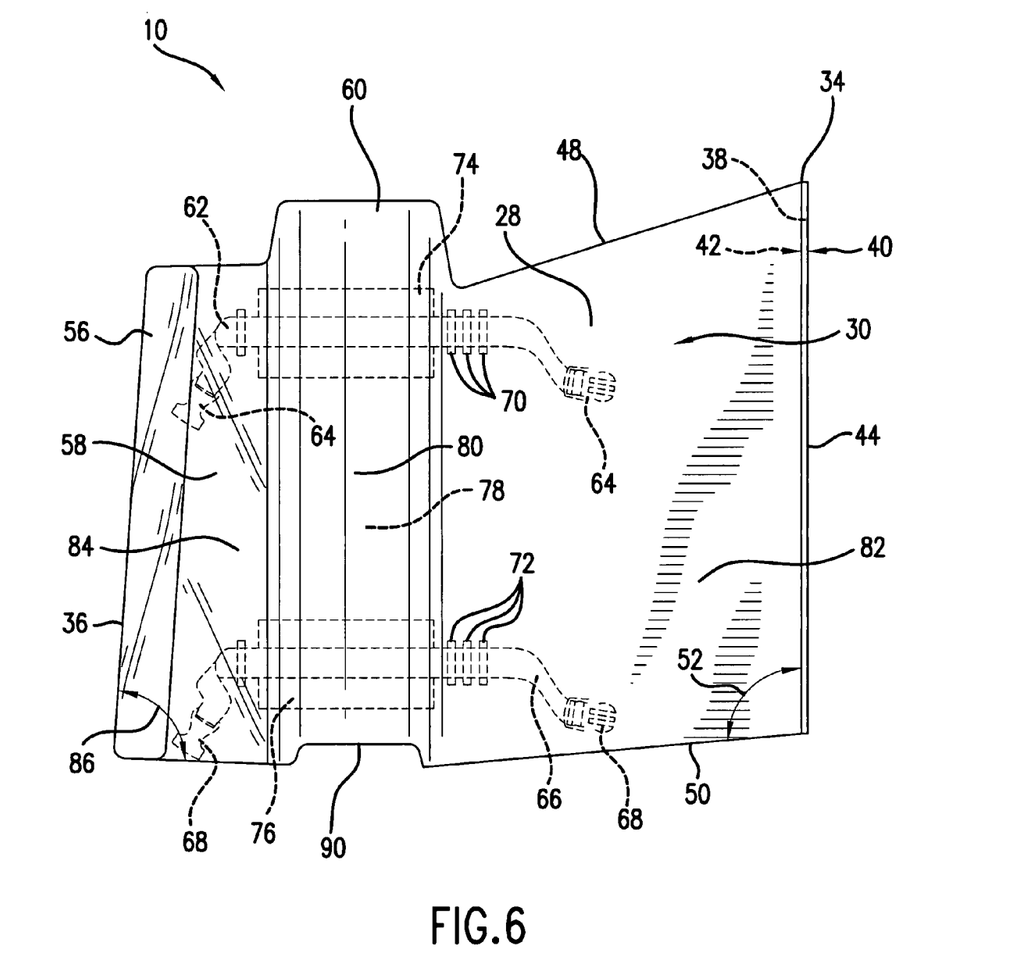
FIG. 6 is a front, flattened plan view of an apparatus to be worn on the left leg of a motorcyclist for warming purposes in accordance with one exemplary embodiment.

FIG. 6 is a front, flattened plan view of an apparatus 10 that is to be attached to the left leg 16 of the motorcyclist 12 during use of the motorcycle 14. The apparatus 10 in FIG. 6 includes a body 28 with features that are the mirror image of the body 28 in the right legged apparatus 10 in FIG. 5. As shown, the end 34 and lip 38 are oriented at an angle 52 while the second end 36 is oriented at an angle 86. Angles 52 and 86 can be the same as or different from one another between left and right legged apparatuses 10 as desired. The various components and features of the left legged apparatus 10 in FIG. 6 are similar to those discussed above with respect to the right legged apparatus 10 and a repeat of this information is not necessary. As stated, the left legged apparatus 10 can be similar in all aspects to the right legged apparatus 10 previously discussed except that it is a mirror image.

Although described as being used in connection with a motorcycle 14, it is to be understood that the apparatus 10 can be used with various types of devices. As used herein the word motorcycle is broad enough to encompass any device that generates heat on which a person is transported. As such, a motorcycle includes but is not limited to a motorbike, moped, motor scooter, and chopper.

The apparatus 10 can be provided with certain design features to facilitate storage when not in use. For example, creases may be included in body 28 in order to fold the apparatus 10 into a compact shape. Additionally or alternatively, hinges or other elements may be used to reduce the size of the apparatus 10 from its normal use position shown in FIG. 1. In further embodiments, components of the apparatus 10 may be detached from one another in order to cause the apparatus 10 to become smaller for storage purposes.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. An apparatus for warming a motorcyclist, comprising:
   a body configured to be worn by a motorcyclist so as to cover at least a portion of the cnemis of the leg of the motorcyclist, wherein said body has an outer surface that is configured to at least partially cover and extend generally from the shin of the motorcyclist across the lateral side of the cnemis of the motorcyclist and terminate at an end that does not extend across the calf to the medial side of the cnemis of the motorcyclist when said body is worn by the motorcyclist;
   a blocking member that extends from said outer surface of said body and directly contacts a motorcycle during operation of the motorcycle when said body is worn by the motorcyclist, wherein said blocking member is made of a resilient material; and
   a lip that extends from said end of said body in a direction generally towards the medial side of the cnemis of the motorcyclist when said body is worn by the motorcyclist.

2. The apparatus as set forth in claim 1, further comprising a second lip that extends from said end of said body in a direction generally away from the medial side of the cnemis of the motorcyclist when said body is worn by the motorcyclist.

3. The apparatus as set forth in claim 1, wherein said body has an inner surface and wherein said lip has an inner surface, wherein at least a portion of said inner surface of said body and said inner surface of said lip define a space into which heated air is present during operation of the motorcycle when said body is worn by the motorcyclist.

4. The apparatus as set forth in claim 1, wherein said body has an upper edge that terminates at said end of said body, and wherein said body has a lower edge that terminates at said end of said body, wherein said end is oriented with respect to said upper edge and said lower edge such that said end extends between said upper edge and said lower edge at an angle that is not perpendicular to said upper edge and said lower edge.

5. The apparatus as set forth in claim 4, wherein said end of said body is oriented so as to extend in the rearward direction of the motorcycle as said end extends from said lower edge of said body to said upper edge of said body during operation of the motorcycle when said body is worn by the motorcyclist.

6. The apparatus as set forth in claim 1, further comprising a scratch guard located on said outer surface of said body, and wherein said body has a knee guard portion configured to cover the knee of the motorcyclist when said body is worn by the motorcyclist.

7. The apparatus as set forth in claim 1, further comprising at least one releasably attachable strap configured for allowing releasable attachment between said body and the cnemis of the motorcyclist, wherein the position of said strap is adjustable with respect to said body.

8. The apparatus as set forth in claim 1, further comprising:
   a first pad located on an interior surface of said body and configured for being positioned between said body and the shin of the motorcyclist when said body is worn by the motorcyclist; and
   a second pad located on said interior surface of said body and configured for being positioned between said body and the shin of the motorcyclist when said body is worn by the motorcyclist, wherein said first pad is located closer to the knee of the motorcyclist than said second pad when said body is worn by the motorcyclist;
   wherein said first pad and said second pad define a space therebetween through which air flows during operation of the motorcycle when said body is worn by the motorcyclist.

9. An apparatus for warming a motorcyclist, comprising:
   a body having an outer surface and an inner surface, wherein said body has a shin portion and an adjacent lateral cnemis portion, and wherein said body has a medial cnemis portion adjacent said shin portion, wherein said body has an end located at said lateral cnemis portion, wherein said body has an upper edge and a lower edge that both terminate at said end, wherein said end is in oblique orientation to both said upper edge and said lower edge;
   a lip extending from said lateral cnemis portion in a direction generally towards the medial side of the cnemis of the motorcyclist when said body is worn by the motorcyclist, wherein said lip has an inner surface, wherein at least a portion of said inner surface of said body and said inner surface of said lip define a space into which heated air is present during operation of the motorcycle when said body is worn by the motorcyclist, wherein said lip does not extend along said upper edge and said lower edge of said body;
   a second lip extending from said lateral cnemis portion in a direction generally away from the medial side of the cnemis of the motorcyclist when said body is worn by the motorcyclist, wherein said second lip does not extend along said upper edge and said lower edge of said body; and
   a blocking member that extends from said outer surface of said body and directly contacts a motorcycle during operation of the motorcycle when said body is worn by the motorcyclist, wherein said blocking member is made of a resilient material.

* * * * *